United States Patent [19]

Bokelmann

[11] 4,284,398
[45] Aug. 18, 1981

[54] APPARATUS FOR THE MANUFACTURE OF A FOAM MATERIAL BALL WITH AN EMBOSSED SURFACE

[75] Inventor: Horst Bokelmann, Bad Wildungen, Fed. Rep. of Germany

[73] Assignee: Metzeler Schaum GmbH, Memmingen, Fed. Rep. of Germany

[21] Appl. No.: 116,791

[22] Filed: Jan. 30, 1980

[30] Foreign Application Priority Data

Feb. 2, 1979 [DE] Fed. Rep. of Germany ....... 2904026

[51] Int. Cl.³ ...................... B29D 27/00; B29C 3/00
[52] U.S. Cl. ............................. 425/394; 273/58 R; 273/DIG. 2; 264/284; 264/321; 425/406
[58] Field of Search .............. 264/321, 46.9, 284; 273/58 R, 58 A, 58 B, 58 BA, 58 E, DIG. 2, 214, 232; 425/383, 406, 394

[56] References Cited

U.S. PATENT DOCUMENTS

| | | | |
|---|---|---|---|
| 2,767,436 | 10/1956 | Noland et al. | 264/321 |
| 3,069,170 | 12/1962 | Dillon | 264/321 X |
| 3,094,758 | 6/1963 | Downie et al. | 425/394 X |
| 3,214,505 | 10/1965 | Pierkowski et al. | 425/394 X |
| 3,647,331 | 3/1972 | Kuratomi | 425/406 X |
| 3,882,218 | 5/1975 | Bixel | 264/321 X |
| 3,994,653 | 11/1976 | Marangoni | 425/394 X |
| 4,053,549 | 10/1977 | Vandor | 264/321 X |

FOREIGN PATENT DOCUMENTS

| | | | |
|---|---|---|---|
| 1484039 | 5/1972 | Fed. Rep. of Germany | 52/309.4 |
| 1214366 | 12/1970 | United Kingdom | 264/145 |

Primary Examiner—Philip Anderson
Attorney, Agent, or Firm—Herbert L. Lerner; Laurence A. Greenberg

[57] ABSTRACT

Method for the manufacture of a ball formed of foam material with surface embossing corresponding to a soccer ball, which includes subdividing the surface of the ball into a plurality of equilateral polygons, and embossing the contour of at least one polygon into the surface of the ball in stages.

6 Claims, 6 Drawing Figures

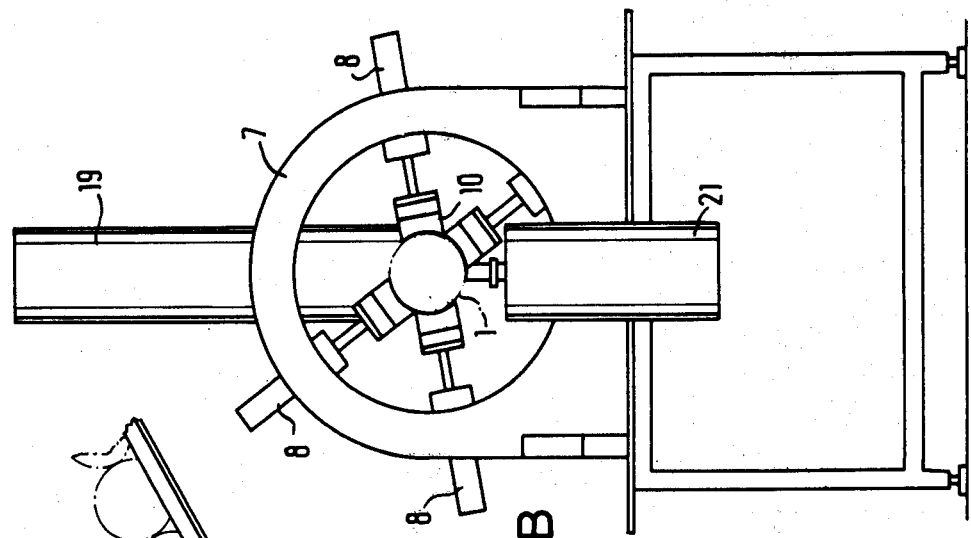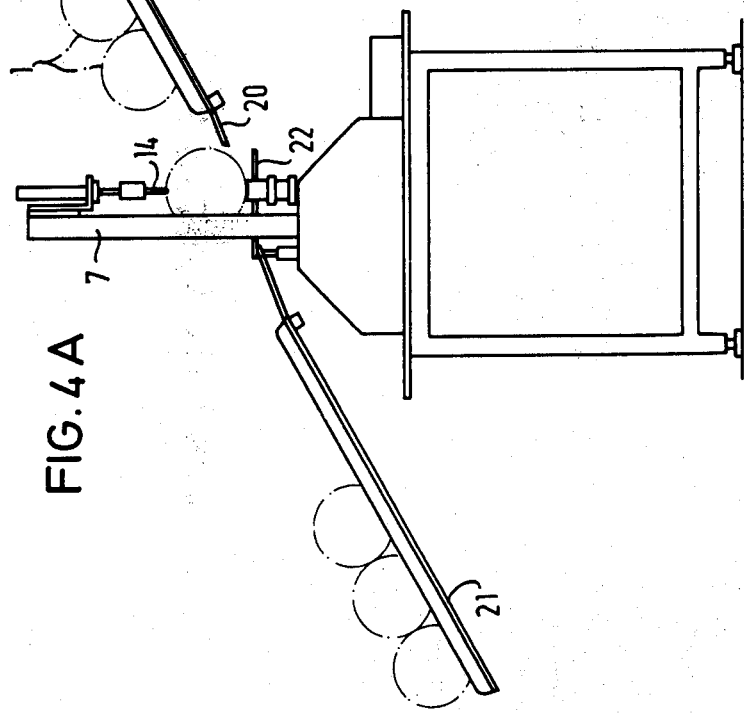

APPARATUS FOR THE MANUFACTURE OF A FOAM MATERIAL BALL WITH AN EMBOSSED SURFACE

The invention relates to an apparatus for manufacturing a ball of foam material with a surface-embossed pattern corresponding to a soccer ball.

In the manufacture of balls for games, made of foam material which simulate conventional sport balls made of leather or other materials, it is conventional to provide these foam material balls with surface embossing similar to the actual model. Such balls are seen for example, in German Petty Patent DE-GM No. 77 3061 and in co-pending U.S. patent application Ser. No. 083,238 filed Oct. 10, 1979 for a tennis ball, the inventor of which is a co-inventor of the instant application. In such products, a closed contour line is burned or embossed-in by rolling on a suitable heated wire. However, this method has difficulties when used for balls having a complicated surface pattern, as is the case with soccer balls for example, whose surface is subdivided into several approximately similar sections.

Accordingly it is an object of the invention to provide an apparatus for the manufacture of a ball of foam material with an embossed surface, which overcomes the hereinafore mentioned disadvantages of the heretofore known devices of this general type, and to do so in a simple manner, and yet very accurately.

With the foregoing and other objects in view there is provided, in accordance with the invention a method for the manufacture of a ball formed of foam material with surface embossing corresponding to a soccer ball, which comprises subdividing the surface of the ball into a plurality of equilateral polygons, and embossing the contour of at least one polygon into the surface of the ball in stages or in sectors.

In accordance with another mode of the invention, there is provided an apparatus adapted for subdividing the surface of the ball into thirty two fields including twelve pentagons and twenty hexagons with each pentagon surrounded by five adjacent hexagons, and embossing each pentagon together with substantially half of the length of the edges of the surrounding hexagons.

In accordance with a further mode of the invention, there is provided an apparatus adapted for simultaneously embossing pentagonal sections which lie on a circumference of the ball, rotating the ball through 120° after embossing, and embossing pentagonal sections adjacent to the pentagonal sections on the circumference after rotating the ball.

In accordance with the device of the invention, there is provided an apparatus for carrying out a method for the manufacture of a ball formed of foam material with surface embossing corresponding to a soccer ball, comprising a ring-shaped tool holder, a plurality of embossing tools, preferably four, disposed about the ring-shaped tool holder at angles relative to each other, the embossing tools being movable toward the center of the ring-shaped tool holder, and means for holding a ball in the center of the ring-shaped tool holder.

In accordance with another feature of the invention, each embossing tool includes an electrically heatable die head in the form of a regular pentagon having extensions or ridges leading from the corners thereof, said extensions or ridges being of equal length to half the length of the edges of the pentagon.

In accordance with a further feature of the invention, the ball holding means includes a nest or support being movable in radial direction of the ring-shaped tool holder and having a spherically-cupped end surface, and a pin being disposed diametrically opposite the nest or support and being movable in radial direction of the ring-shaped tool holder.

In accordance with an added feature of the invention, the nest or support is rotatable about its longitudinal axis.

In accordance with an additional feature of the invention, for transporting the balls to, and away from, the machine, the ring-shaped tool holder includes an inclined ball feed guide disposed on one side of the ring-shaped tool holder, closable or lockable means for feeding balls disposed on the ball feed guide to said ball holding means, and a ball removal guide disposed on another side of the ring-shaped tool holder.

In accordance with a concomitant feature of the invention, there are provided ring means concentrically disposed on the nest for catching a ball which has rolled off the ball feed guide, the ring means being movable in radial direction of the ring-shaped tool holder, toward and away from the location of the ball during embossing.

With a method of this type and the corresponding apparatus, it is made possible, in a simple manner, to apply to a ball of foam material the exact surface embossing corresponding to a soccer ball, and to perform this process in a completely automated manner as well.

Other features which are considered characteristic for the invention are set forth in the appended claims.

Although the invention is illustrated and described herein as embodied in an apparatus for the manufacture of a ball of foam material with an embossed surface, it is nevertheless not intended to be limited to the details shown, since various modifications and structural changes may be made therein without departing from the spirit of the invention and within the scope and range of equivalents of the claims.

The construction of the apparatus, however, together with additional objects and advantages thereof will be best understood from the following description of specific embodiments when read in connection with the accompanying drawings, in which:

FIG. 4A is a diagrammatic side elevational view of the complete apparatus of the invention, with the means for transporting the work to and from the machine; and FIG. 4B is a front elevational view of the complete apparatus of FIG. 4A.

Figure 1:
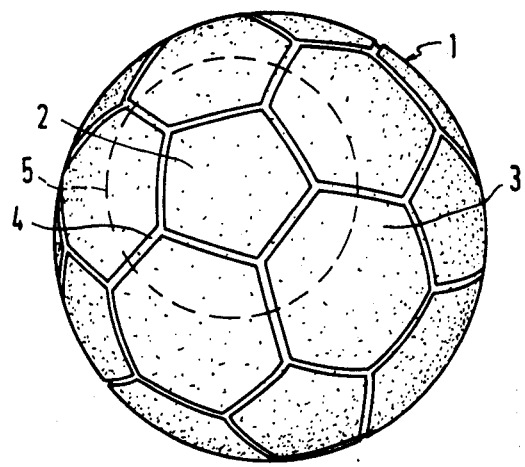
FIG. 1 is a diagrammatic view of a ball of foam material with a suitably embossed surface.

Referring now to the figures of the drawing and first particularly to FIG. 1 thereof, it is seen that the surface of the ball 1 is subdivided into a number of equilateral polygons, in total twelve pentagons 2 and twenty hexagons 3, so that each pentagon is surrounded by five hexagons. When embossing the surface of the round ball, provision should be made—as will be explained in detail hereinbelow—that each tool embosses a pentagon together with the half edge-length 4 of its adjacent neighboring hexagons which extend from the corners of the pentagon as radially extending edges. Therefore, in all, a portion is embossed which lies approximately within the dotted circle 5.

Figure 2:
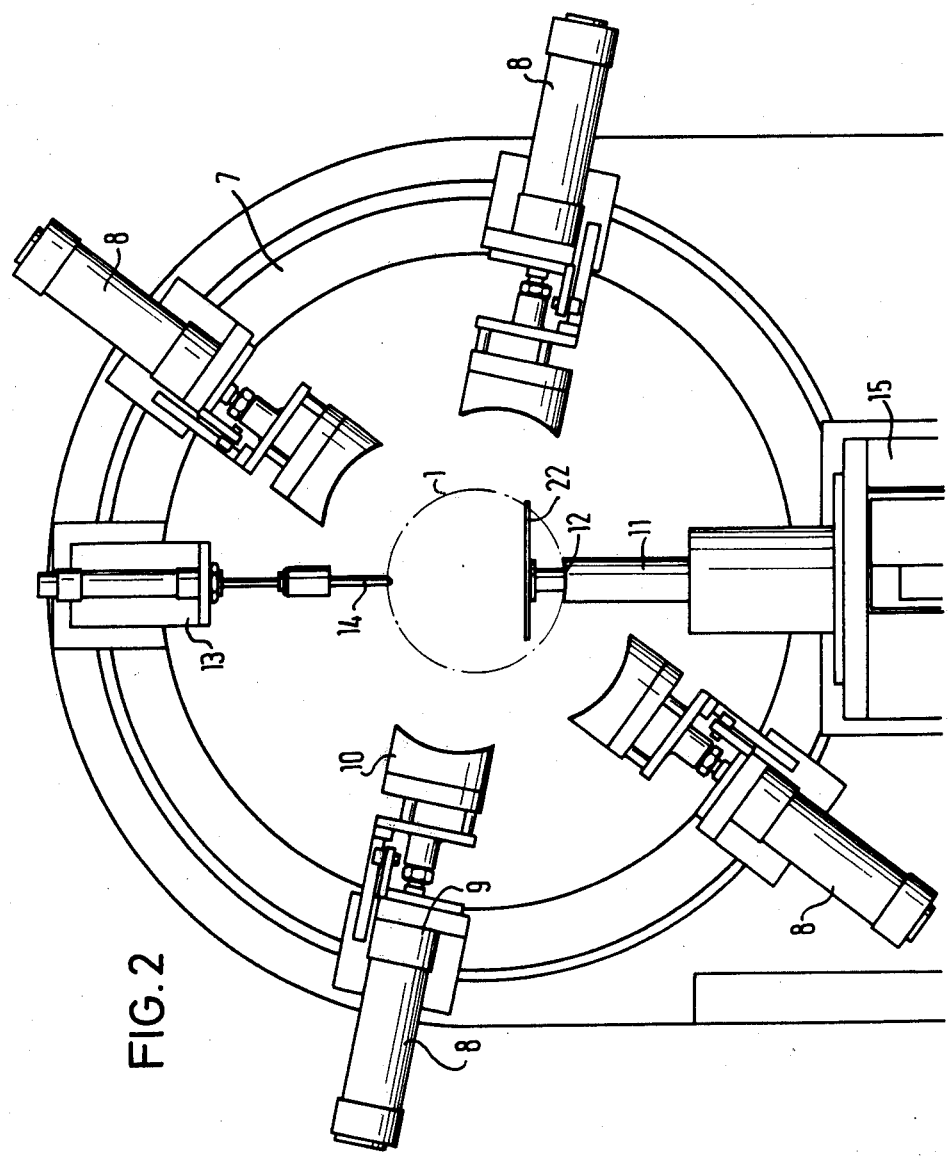
FIG. 2 is a diagrammatic front elevational view of the tool holder and tools of an embossing apparatus according to the invention.

In FIG. 2, the thermal embossing or burn-in apparatus is shown in detail in a front view. It includes a ring-shaped tool holder 7, having on its circumference four heated embossing or burn-in tools which extend radially inwardly, and are movable toward the center. These embossing tools 8 are disposed at angles relative to each other corresponding to the circumferential lines of the pentagons which lie on the centrally positioned ball 1. The embossing tools 8 are provided with die heads 10 which can move radially by virtue of the fact that they are powered by hydraulic cylinders 9; the die heads will be explained in detail hereinbelow. Furthermore, in the vertical axis of the tool holder 7, there is disposed a holding fixture for the ball, including a nest 11 with a spherical cup-shaped front end surface 12 for retaining the ball and a pin 14. The pin 14 is disposed diametrically opposite the nest 11 in the tool holder 7, and is radially movable by the stroke of a cylinder 13, so that the pin 14 is lowered onto the ball 1 from the top and holds it in a fixed position. The nest 11 is additionally guided at its lower end in rotating means 15 which allows the nest to be turned through a predetermined angle.

Figure 3B:
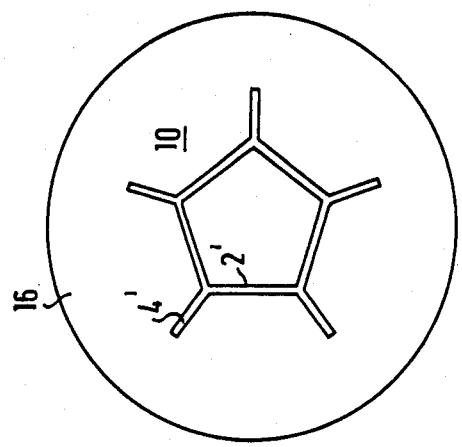
FIG. 3B is a side elevational view of the cutting head or die of the tool of FIG. 3A.
Figure 3A:
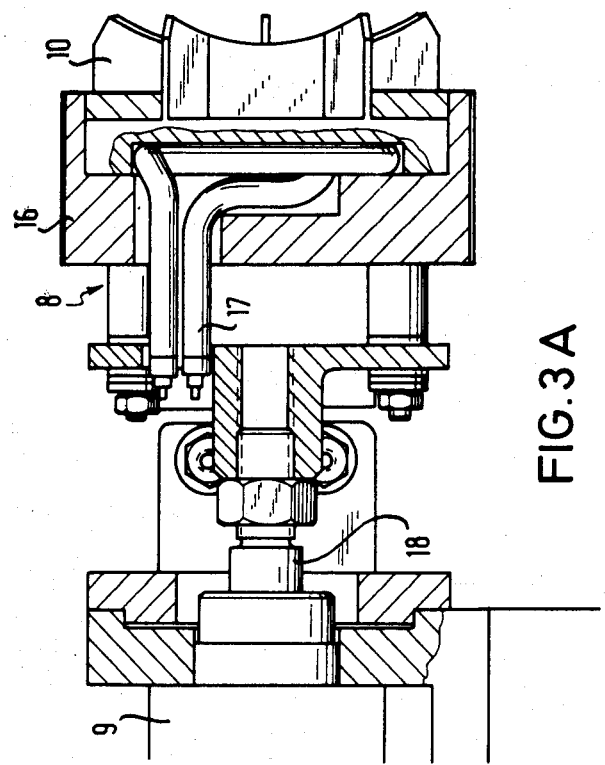
FIG. 3A is a fragmentary enlarged longitudinal sectional view of the tool of FIG. 2.

As can be seen in detail from FIG. 3A, the tool 8 includes the die head 10 which is retained in a guide head 16, and can be heated to approximately 300° by a heating coil 17 that is electrically powered. The guide head 16 can be radially moved by the piston 18 in the hydraulic cylinder 9.

As can be seen from FIG. 3B, the die head 10 comprises the symmetrical pentagon 2 with ridges or extensions 4, extending from the corners, which correspond to half the length of the pentagon and thereby to half the length of the edge of the adjacent hexagons as well.

FIGS. 4A and 4B show a side view and front view, respectively, of the complete apparatus, which will also be used for explaining the whole manufacturing procedure.

As seen from FIG. 4A, disposed at one side of the tool holding device 7 are inclined ball feeding means 19, having a swingable feedlock 20, while on the other side thereof inclined ball removal means 21 are provided.

The function and operation of the apparatus according to the invention is as follows: After releasing the feedlock 20, a smooth ball rolls into the center of the tool holder 7 and is caught there by a ring-shaped bracket 22, also seen in FIG. 2, which grips the ball at the lower portion thereof. After lowering this bracket 22, into the position shown in FIG. 4A, the ball 1 rests on the front surface 12 of the nest 11 and is held in position by the pin 14 that comes down from the top. Then the four tools 8 move radially inwardly, until the die heads 10 come in contact with the surface of the ball 1, and emboss it to a predetermined radial depth and for a predetermined length of time, for each stroke. The heads 10 form four pentagonal zones on a circumferential line, together with the adjacent partial hexagons which lie therebetween. The moved-in position of the tools 8 can be clearly seen from FIG. 4B. Thereafter, the tools 8 move out again, the ball 1 is turned 120°, and after moving the tools 8 in again, the next surface zone is correspondingly embossed. After a further rotation about 120°, and motions of the tools, the whole surface is embossed with 32 fields according to the ball shown in FIG. 1. After raising the pin 14, the ball can be ejected onto the ball removal means 21, by a blower, for example, which is not shown in the figures.

Because the ball is very exactly positioned in the center of the tool holder and can be rotated by a suitable drive of the nest 11 around an exactly predetermined angle, an exact embossing of the surface is possible with a guaranty of exactly matching lines of the edges of the hexagons which are formed by several sections.

There are claimed:

1. Apparatus for burning depressions into the surface of a spherical foam material body, comprising in a ring-shaped tool holder, a plurality of electrically heatable burn-in tools having suitably formed depressions and being disposed about said ring-shaped tool holder at angles relative to each other, said embossing tools being movable toward the center of said ring-shaped tool holder, a nest being disposed in said ring-shaped tool holder, movable in radial direction of said ring-shaped tool holder and having a spherically-cupped end surface, and a pin being disposed diametrically opposite said nest for fixing the spherical foam material body in a work position, said nest being rotatable about its longitudinal axis.

2. Apparatus according to claim 1, including four embossing tools.

3. Apparatus according to claim 2, wherein each burn-in head is in the form of a regular pentagon having extensions leading from the corners thereof, said extensions being of equal length to half the length of the edges of the pentagon.

4. Apparatus according to claim 2, wherein said pin is movable in radial direction of said ring-shaped tool holder.

5. Apparatus according to claim 3 or 4, wherein said ring-shaped tool holder includes an inclined ball feed guide disposed on one side of said ring-shaped tool holder, closable means for feeding balls disposed on said ball feed guide, and a ball removal guide disposed on another side of said ring-shaped tool holder.

6. Apparatus according to claim 5, including ring-means concentrically disposed on said nest for catching a ball which has rolled off said ball feed guide, said ring means being movable in radial direction of said ring-shaped tool holder.

* * * * *